United States Patent
Shoda et al.

(10) Patent No.: US 7,652,800 B2
(45) Date of Patent: Jan. 26, 2010

(54) APPARATUS AND METHOD FOR IMAGE FORMING

(75) Inventors: Hirokazu Shoda, Kanagawa-Ken (JP); Kunihiko Miura, Kanagawa-Ken (JP); Hidekazu Sekizawa, Kanagawa-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 995 days.

(21) Appl. No.: 11/260,257

(22) Filed: Oct. 28, 2005

(65) Prior Publication Data

US 2006/0209317 A1 Sep. 21, 2006

(30) Foreign Application Priority Data

Mar. 16, 2005 (JP) ............................. 2005-074364

(51) Int. Cl.
*H04N 1/04* (2006.01)
(52) U.S. Cl. ...................... 358/451; 358/482; 358/483; 358/505
(58) Field of Classification Search ................. 358/451, 358/482, 483, 505, 513, 514
See application file for complete search history.

(56) References Cited

U.S. PATENT DOCUMENTS

| 6,831,761 | B2 * | 12/2004 | Cardot et al. ............... 358/505 |
| 7,046,402 | B2 * | 5/2006 | Watanabe ................. 358/514 |
| 7,230,225 | B2 * | 6/2007 | Tanimoto et al. ......... 250/208.1 |
| 2003/0112475 | A1 | 6/2003 | Shoda et al. |
| 2004/0174576 | A1 | 9/2004 | Kamisuwa et al. |
| 2004/0196514 | A1 | 10/2004 | Tanimoto et al. |
| 2004/0223196 | A1 | 11/2004 | Tanimoto et al. |
| 2005/0195281 | A1 | 9/2005 | Misaka et al. |

FOREIGN PATENT DOCUMENTS

| JP | 10-233916 A | 9/1998 |
| JP | 10-290362 A | 10/1998 |
| JP | 2001-189850 A | 10/2001 |

* cited by examiner

*Primary Examiner*—Houshang Safaipour
(74) *Attorney, Agent, or Firm*—Foley & Lardner LLP

(57) ABSTRACT

An image forming apparatus according to an embodiment of the invention reads an original by mechanically moving an axial light source in a subscanning direction perpendicular to the axis. The image forming apparatus includes: a sensor whose resolution in a main scanning direction parallel to the axis of the axial light source is higher than a designated resolution; a controller that controls the driving speed of the axial light source so that the resolution in the subscanning direction is higher than the designated resolution; an original-image-data generating unit that generates original image data with a resolution higher than the designated resolution in response to the output from the sensor; and an image reducing unit that generates reduced pixels fewer than a specified number of pixels in the original image data to generate a reduced image with a resolution equal to the designated resolution.

8 Claims, 11 Drawing Sheets

FIG. 8A PIXEL INTENSITIES OF ORIGINAL IMAGE DATA

| 30 | 20 | 30 | 200 | 220 | 160 | 15 | 20 |
|----|----|----|-----|-----|-----|----|----|

FIG. 8B DISCRIMINATION OF CHARACTER AND NONCHARACTER

| 0 | 0 | 0 | 1 | 1 | 1 | 0 | 0 |
|---|---|---|---|---|---|---|---|

FIG. 8C DENSITY GROUP

| 1 | 1 | 1 | 3 | 3 | 2 | 1 | 1 |
|---|---|---|---|---|---|---|---|

FIG. 8D

WEIGHTING FACTOR TABLE

|  | DISCRIMINATION "0" (NONCHARACTER) | DISCRIMINATION "1" (CHARACTER) |
|---|---|---|
| DENSITY GROUP 1 | 0.3 | 0.3 |
| DENSITY GROUP 2 | 0.5 | 1.0 |
| DENSITY GROUP 3 | 0.8 | 1.2 |

FIG. 8E SELECTED WEIGHTING FACTOR

| 0.3 | 0.3 | 0.3 | 1.2 | 1.2 | 1.0 | 0.3 | 0.3 |
|-----|-----|-----|-----|-----|-----|-----|-----|

FIG. 8F AVERAGED INTENSITIES BY WEIGHING

| 25 | 166 | 192.7 | 17.5 |
|----|-----|-------|------|

FIG. 12

| DESIGNATED RESOLUTION | RESOLUTION OF SENSOR OUTPUT (INPUTS TO RESOLUTION CONVERTING UNIT) | | | | RESOLUTION OF ORIGINAL IMAGE DATA (OUTPUT FROM RESOLUTION CONVERTING UNIT) | | | | RESOLUTION OF OUTPUT OF IMAGE REDUCING UNIT (SAME AS DESIGNATED RESOLUTION) | | | |
|---|---|---|---|---|---|---|---|---|---|---|---|---|
| | SUBSCANNING DIRECTION | | MAIN SCANNING DIRECTION | | SUBSCANNING DIRECTION | | MAIN SCANNING DIRECTION | | SUBSCANNING DIRECTION | | MAIN SCANNING DIRECTION | |
| | RGB | B/W | RGB | B/W | R'G'B' | | | | R"G"B" | | R"G"B" | |
| 600dpi | 300dpi | 600dpi | 300dpi | 600dpi | 600dpi | | 600dpi | | 600dpi | | 600dpi | |
| 400dpi | 300dpi | 600dpi | 300dpi | 600dpi | 600dpi | | 600dpi | | 400dpi | | 400dpi | |
| 300dpi | 300dpi | 600dpi | 300dpi | 600dpi | 600dpi | | 600dpi | | 300dpi | | 300dpi | |
| 200dpi | 200dpi | 400dpi | 300dpi | 600dpi | 400dpi | | 600dpi | | 200dpi | | 200dpi | |
| 150dpi | 150dpi | 300dpi | 300dpi | 600dpi | 300dpi | | 600dpi | | 150dpi | | 150dpi | |

HIGHER RESOLUTION THAN DESIGNATED IN SUBSCANNING DIRECTION (RGB RESOLUTION IS HALF OF B/W)

RGB RESOLUTION IS CONVERTED TO BE SAME AS B/W

APPARATUS AND METHOD FOR IMAGE FORMING

BACKGROUND OF THE INVENTION

1. Field of the Invention

The present invention relates to an apparatus and a method for image forming, and in particular, it relates to an apparatus and a method for image forming that store and print or display input documents or images.

2. Description of the Related Art

It has become common practice for companies to convert documents printed on paper or the like into electronic form to challenge the information sharing and to solve the problem of storage space.

To generate image data, a document printed on plane paper is read by a scanner into electronic form, which requires a high-resolution image reading technique to ensure the reproducibility of the original print document.

Particularly, small characters written on an original lose their shape in image data read by a low-resolution scanner or the like, losing the reproducibility of the document.

Digitalized documents have an important meaning particularly when they are not only stored in the company or the like that read the documents but also transmitted to remote locations via communication networks. Digitalized documents are also important to share information via network communications.

Such transfer of electronic documents via communication lines has a limitation to communication speed because image data read with a high resolution, e.g., 600 dpi, is very large in file size. Particularly, large amounts of high-resolution data take a lot of time to transfer, thus sometimes hindering transfer in practice.

Accordingly, in the case of generating image data for network communications, electronic documents of small file size are generally generated by reading documents at low resolution of about 200 dpi.

Both of requirement for low resolution (small file size) and requirement for high resolution cannot be fully satisfied at the same time. However, solutions for individual applications are being tried.

For example, JP-A 10-233916 discloses a technique of efficiently generating low-resolution image data for display and high-resolution image data for printing.

As has been described above, image data for network communications is generally produced at low resolution of about 200 dpi in view of the size of files transmitted.

However, the low-resolution image data has low character reproducibility, having lower readability than that of high-resolution image data. This tendency is notable particularly for documents including small characters.

Accordingly, there is a strong demand for an image forming apparatus that can generate image data having high character reproducibility and readability while avoiding a decrease in communication speed by holding the file size as small as that of conventional low-resolution image data.

SUMMARY OF THE INVENTION

The present invention has been made in view of the above-described circumstances. Accordingly, it is an object of the invention to provide an image forming apparatus having high character reproducibility and readability while avoiding a decrease in communication speed by holding the file size as small as that of conventional low-resolution image data.

In order to achieve the above object, an image forming apparatus according to a first aspect of the invention reads an original by mechanically moving an axial light source in a subscanning direction perpendicular to the axis. The image forming apparatus includes: a sensor configured such that the resolution in a main scanning direction parallel to the axis of the axial light source is higher than a designated resolution; a controller that controls the driving speed of the axial light source so that the resolution in the subscanning direction is higher than the designated resolution; an original-image-data generating unit that generates original image data with a resolution higher than the designated resolution in response to the output signal from the sensor; and an image reducing unit that generates reduced pixels fewer than a specified number of pixels in the main scanning direction and the subscanning direction in the original image data to generate a reduced image with a resolution in the main scanning direction and the subscanning direction equal to the designated resolution.

An image forming method according to a second aspect of the invention reads an original by mechanically moving an axial light source in a subscanning direction perpendicular to the axis. The image forming method includes the steps of: outputting a signal from a sensor, the signal indicating a resolution in a main scanning direction parallel to the axis of the axial light source higher than a designated resolution; controlling the driving speed of the axial light source so that the resolution in the subscanning direction is higher than the designated resolution; generating original image data with a resolution higher than the designated resolution in response to the output signal from the sensor; and generating reduced pixels fewer than a specified number of pixels in the main scanning direction and the subscanning direction in the original image data to generate a reduced image with a resolution in the main scanning direction and the subscanning direction equal to the designated resolution.

The image forming apparatus and the image forming method according to aspects of the invention can generate image data having high character reproducibility and readability while holding the file size as small as that of conventional low-resolution image data.

BRIEF DESCRIPTION OF THE DRAWINGS

FIG. 8A is a diagram of the intensities of the pixel signals of original image data according to the first embodiment;

FIG. 8B is a diagram of the results of discrimination between a character and a noncharacter according to the first embodiment;

FIG. 8C is a diagram of density groups in which the intensities of image signals are classified according to the first embodiment;

FIG. 8D is a diagram of an example of a weighting factor table according to the first embodiment;

FIGS. 8E and 8F are a diagrams showing the concept of image reduction of the second structural example of the image reducing unit of the image forming apparatus according to the first embodiment;

FIG. 12 is a diagram of an example of resolution conversion of the image forming apparatus according to the second embodiment.

DESCRIPTION OF THE PREFERRED EMBODIMENTS

An image forming apparatus and method according to embodiments of the invention will be described with reference to the accompanying drawings.

(1) First Embodiment

Figure 1:
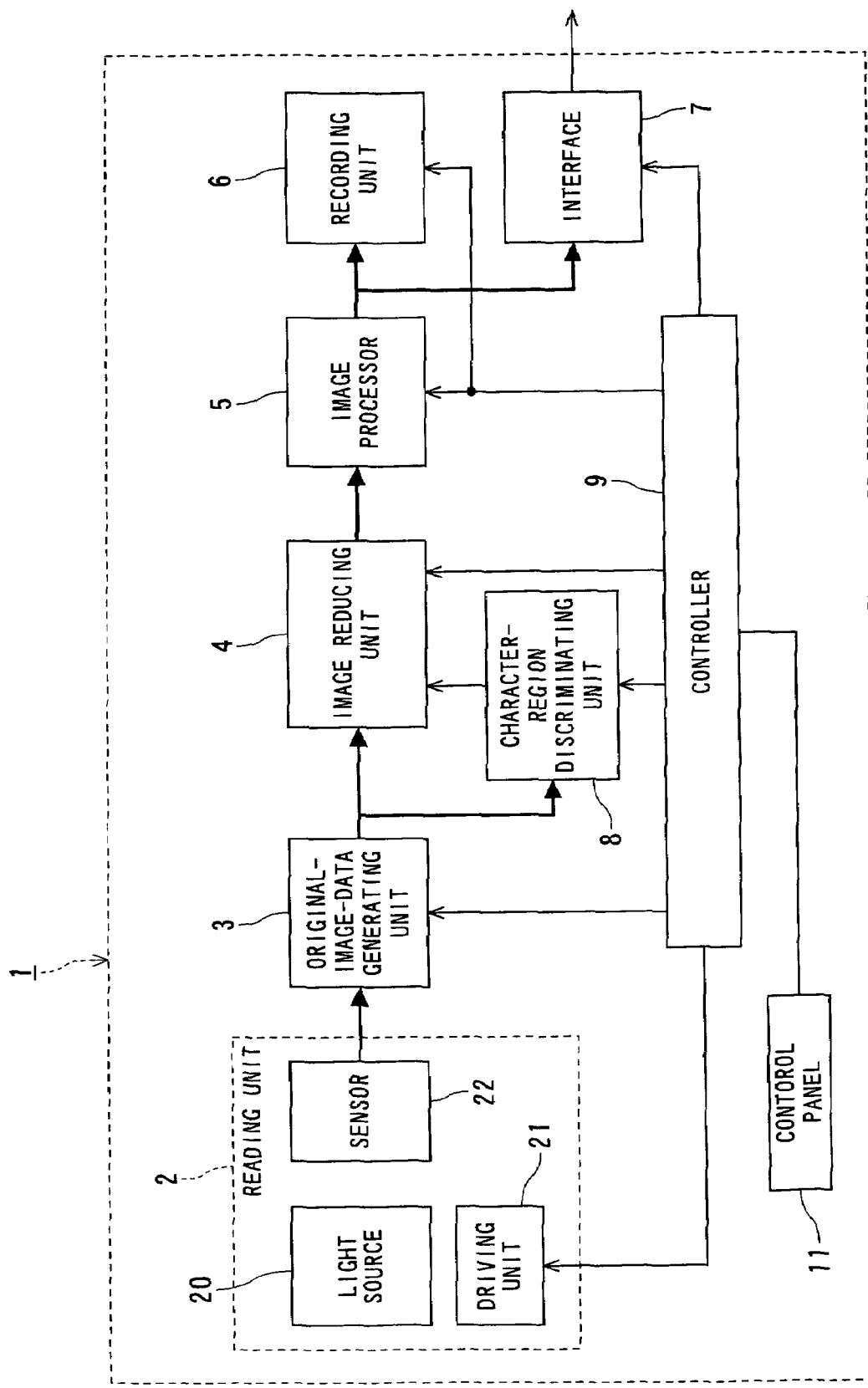
FIG. 1 is a block diagram of an image forming apparatus according to a first embodiment of the invention.

FIG. 1 shows the structure of an image forming apparatus 1 according to a first embodiment of the invention.

The image forming apparatus 1 includes a reading unit 2 that reads documents at resolutions higher than a designated resolution; an original-image-data generating unit 3 that generates original image data with the designated resolution or higher in response to an output signal from a sensor 22 of the reading unit 2; a character-region discriminating unit 8 that discriminates between a character region or a region other than the character region (hereinafter, referred to as a noncharacter region); and an image reducing unit 4 that reduces the total number of pixels while enhancing the pixels in the character region to generate image data with the designated resolution (reduced image).

The image forming apparatus 1 further includes: an image processor 5 that executes image processing such as color conversion to the reduced image generated by the image reducing unit 4; a recording unit 6 that prints the image data; and an interface 7 that transfers the image data via, for example, an external communication network.

The reading unit 2 (also referred to as a scanner 2) includes: an axial light source 20 that emits light onto an original; a driving unit 21 that drives the light source 20 in a subscanning direction (in the direction perpendicular to the axis of the light source 20); and the sensor 22 that converts reflected light from a document to an electric signal.

The sensor 22 is composed of, e.g., a linearly arrayed large number of CCD elements. The direction of the linear array of the sensor 22 is called a main scanning direction. The resolution in the main scanning direction is determined depending on the density of the array of the CCD elements; for example, 600 dpi.

The resolution in the subscanning direction depends on the driving speed in the subscanning direction and the reading time of the CCDs. In general, when the driving speed is high, the resolution in the subscanning direction is low (rough); when the driving speed is low, the resolution in the subscanning direction is high (dense).

Figure 2:
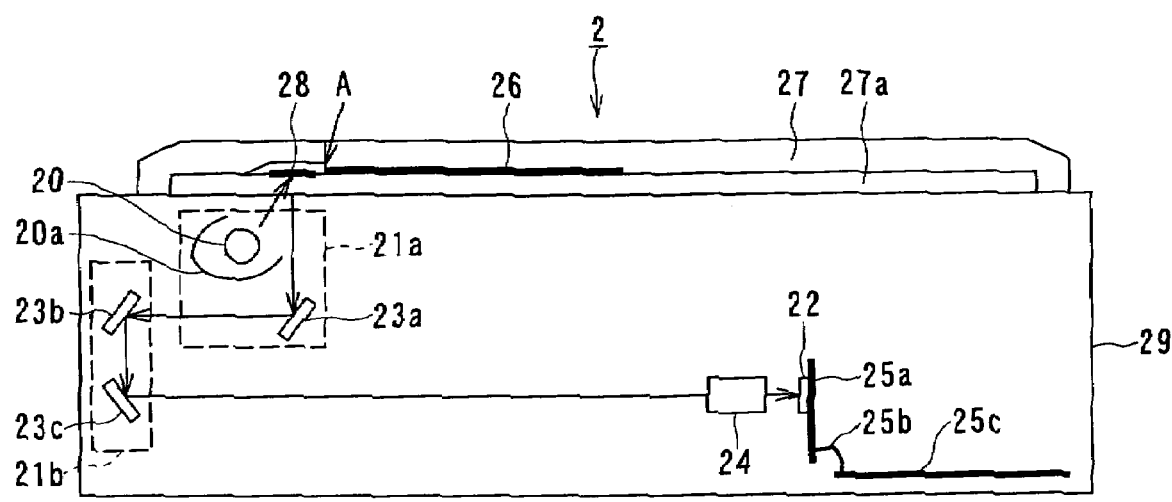
FIG. 2 is a diagram showing the structure of a reading unit of the image forming apparatus according to the first embodiment.

FIG. 2 is a diagram showing an example of the structure of the reading unit 2.

The reading unit 2 includes a casing 29 and a copyholder 27. The copyholder 27 holds an original 26 on an original glass plate 27a disposed on the top of the casing 29.

Light emitted from the columnar light source 20 is collected by a reflector 20a, and then passes through the original glass plate 27a onto an original. Reflected light from the original is reflected by mirrors 23a, 23b, and 23c, then collected by a condenser lens 24, and is then incident on the CCD line sensor (sensor) 22 mounted on a board 25a. The reflected light from the original is converted to an electric signal by the CCD line sensor (sensor) 22 and transmitted to a control board 25c via a cable 25b.

The light source 20 and the mirrors 23a, 23b, and 23c are accommodated in carriages 21a and 21b. The carriages 21a and 21b are driven by a driver (not shown) in the subscanning direction (laterally in FIG. 2).

The output signal from the sensor 22 of the reading unit 2 is input to the original-image-data generating unit 3, where original image data is generated.

The lateral resolution of an image (e.g., in the main scanning direction) and the vertical resolution (e.g., in the subscanning direction) do not necessarily need to agree with each other in the stage of original image data. They have only to be agreed to a designated resolution finally in the subsequent stage.

The designated resolution can be set on a control panel 11 of FIG. 1 by a user. When the user desires high resolution, e.g., 600 dpi, the resolution can be set. When low resolution, e.g., 200 dpi, is sufficient, the resolution can be set on the control panel 11.

When the generated final image data is distributed via a network, the file size of the image comes into question. Accordingly, for network distribution, an image must finally be converted to image data with a low resolution of about 200 dpi to 150 dpi.

Figure 3:
FIG. 3 is an explanatory diagram of resolution conversion of the image forming apparatus according to the first embodiment.

FIG. 3 is a diagram showing an example of the resolution conversion of the image forming apparatus 1 according to the first embodiment.

The designated resolution of FIG. 3 is set by a user as appropriate. The example of FIG. 3 shows the relationship of the resolutions of image data set in the range of 600 dpi to 150 dpi.

The resolutions of original image data are of an image generated by the original-image-data generating unit 3, showing the resolutions in the subscanning direction and the main scanning direction. The resolution in the subscanning direction depends on the driving speed of the light source 20.

Conventional image forming apparatus has generally adopted a system that controls the driving speed so that a designated resolution and the resolution in the subscanning direction match.

The first embodiment of the invention adopts a system that controls the driving speed so that, when the designated resolution becomes low, less than 300 dpi in the example of FIG.

3, the designated resolution is not agreed with the resolution in the subscanning direction, but becomes higher than the designated resolution.

For example, even if the designated resolution is 200 dpi or 150 dpi, the resolutions of the original image data in the subscanning direction are set to be 300 dpi.

In contrast, the resolution in the main scanning direction does not depend on the driving speed. The maximum resolution is determined by the linear CCDs themselves, which is 600 dpi in the example of FIG. 3. The resolution can be converted by thinning-out of pixels in the main scanning direction in principle. In this embodiment, however, the conversion of resolution is executed by the image reducing unit 4 in the subsequent stage.

Since this embodiment is assumed to deal with color images, resolutions (equal resolution) of the three primary colors RGB are shown in FIG. 3. The invention also applies to the case of treating only monochrome images.

The image reducing unit 4 reduces original image data so that the resolution agrees with the designated resolution. AS shown in FIG. 3, both of the resolutions in the main scanning direction and the subscanning direction are agreed with the designated resolutions.

The image reducing unit 4 reduces original image data to match the designated resolution so that characters are particularly enhanced. A concrete reducing method will be described below.

(2) First Image Reducing Method

In general, to convert resolution from high to low, a specified number of pixels to be reduced are subjected to conversion processing to generate pixels fewer than the specified number. For example, to convert resolution from 300 dpi to 150 dpi, the number of pixels is converted from two to one. For conversion from 300 dpi to 200 dpi, the number of pixels is converted to 1.5 to 1.

The first image reducing method according to the first embodiment adopts a system that switches the reducing method depending on whether or not a specified number of pixels to be reduced contain characters.

For this purpose, the character region and the noncharacter region of the original image data must be discriminated. In this embodiment, the discrimination is executed by the character-region discriminating unit 8.

Figure 4:
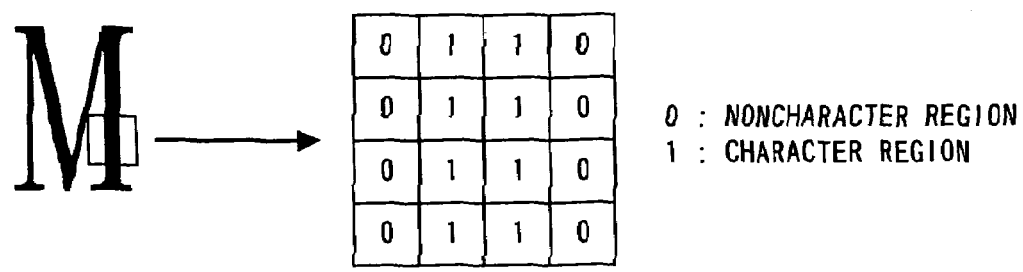
FIG. 4 is an explanatory diagram of the concept of the operation of a character-region discriminating unit of the image forming apparatus according to the first embodiment.

FIG. 4 is a diagram for explaining the concept of the operation of the character-region discriminating unit 8.

Specifically, original image data is subjected to differential two-dimensional filtering, e.g., Sobel filtering, which has appropriate extent for the original image data. The character-region discriminating unit 8 compares a filter output value to a specified threshold to determine values exceeding the threshold to be "1", that is a character region, and values lower than the threshold to be a noncharacter region "0".

FIG. 4 is a diagram showing an example of a process result on character "M". This shows that the part of the right leg of the character "M" is recognized as a character region "1", and the parts on both sides are recognized as noncharacter regions "0".

Figure 5:
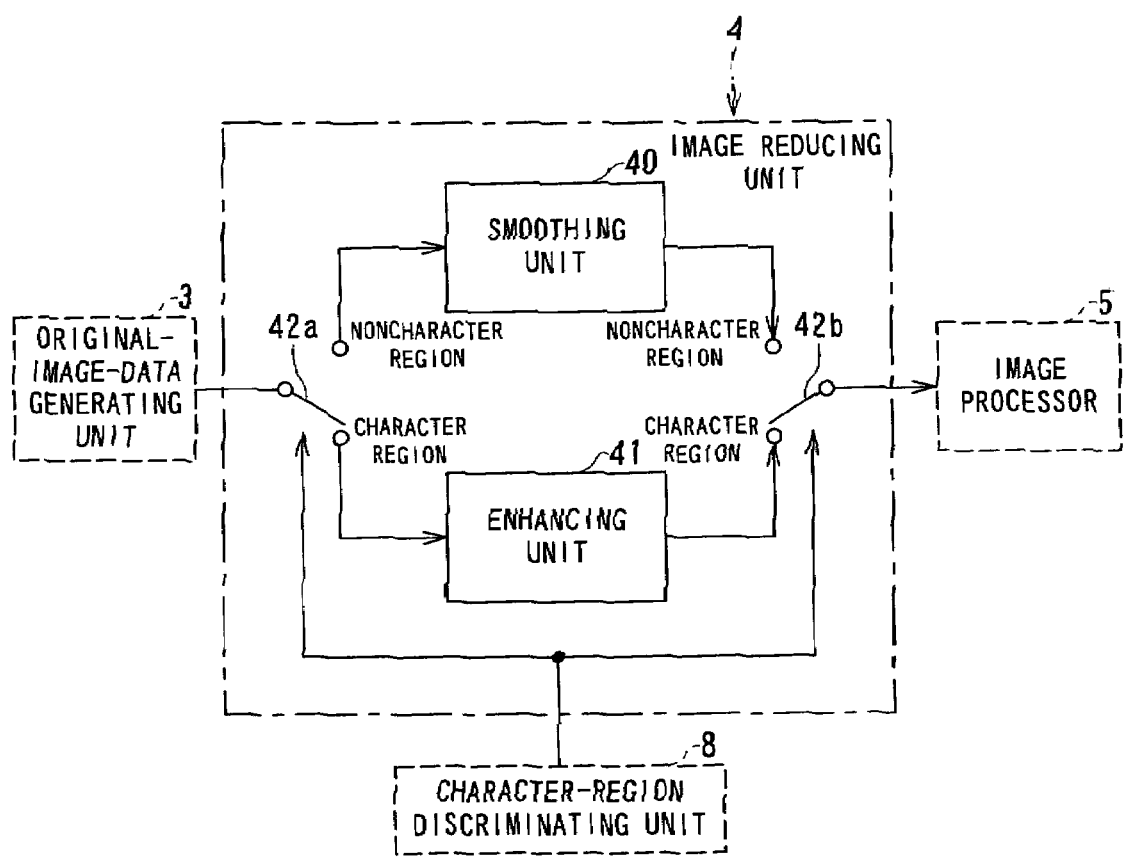
FIG. 5 is a block diagram of a first structural example of an image reducing unit of the image forming apparatus according to the first embodiment.

FIG. 5 is a block diagram of the image reducing unit 4.

The first image reducing method adopts a system that switches a smoothing unit 40 and an enhancing unit 41 depending on the determination whether the character region or the noncharacter region.

Specifically, when at least one pixel in the character region is contained in a specified number of pixels being reduced, the process is switched to the enhancing unit 41 to execute character enhancement processing. In the character enhancement processing, only the pixels in the character region are extracted from the specified number of target pixels, and the mean value of the signal intensities of the pixels are calculated to determine the signal intensity of the pixels after reduction processing. The pixels in the noncharacter region are excluded from the averaging process. When only one pixel in the character region is present in the specified number of target pixels, the signal intensity of the pixel is taken as the signal intensity of the pixels after the reduction processing.

On the other hand, when the pixel in the character region is not contained in a specified number of target pixels, the switches 42*a* and 42*b* are switched to the smoothing unit 40. In the smoothing unit 40, the result of simply averaging the signal intensities of the specified number of target pixels is taken as the signal intensity of the pixels after the reduction processing.

In the foregoing process, when the target pixels contain both of the pixels in the character region and the pixels in the noncharacter region, the averaging process is executed while excluding the pixels in the noncharacter region. This indicates that the reduction processing is executed while the weight of the signal intensity of the pixels in the character region is set higher than that of the noncharacter region.

FIGS. 6A to 6D are diagrams explaining the foregoing reduction process using a concrete example. This example shows a case in which the resolution of 300 dpi is converted to the resolution of 150 dpi, in which two pixels are converted to one pixel. This corresponds to a case in which the number of pixels to be reduced is two.

Figure 6:
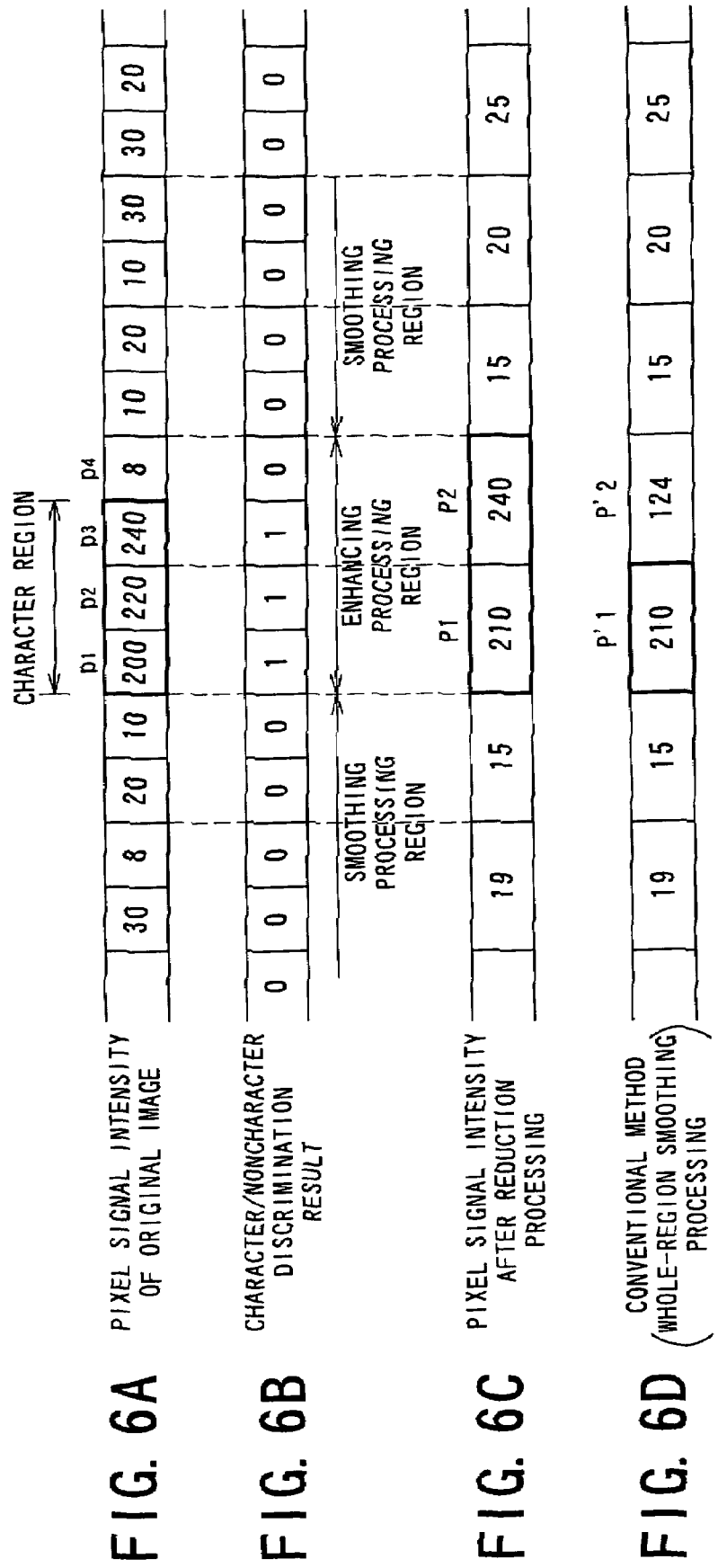
FIGS. 6A to 6C are diagrams showing the concept of image reduction of the first structural example of the image reducing unit of the image forming apparatus according to the first embodiment.
FIG. 6D is a diagram of the results of conventional whole-region smoothing processing according to the first embodiment.

FIG. 6A shows the respective signal intensities of the pixels of original image data; FIG. 6B shows the discrimination result between a character and a noncharacter; and FIG. 6C shows the signal intensities of the pixels after reduction processing.

The signal intensity of a pixel P1 obtained by reducing target pixels p1 and p2 comes to the mean value "210" of the signal intensities of the pixels p1 and p2. The signal intensity of a pixel P2 obtained by reducing target pixels p3 and p4 comes to the signal intensity "240" of the pixel p3 (since the pixel p4 is excluded from the averaging processing because it is a noncharacter).

According to this embodiment, as shown in FIG. 6C, the signal intensities (p1, p2, and p3) of the character region in the original image data are maintained also after the reduction processing (P1 and P2).

In contrast, FIG. 6D shows the results of conventional whole-region smoothing processing (simple averaging). As shown in FIG. 6D, the signal intensity of a pixel P2' is reduced to about half of that before reduction processing, while a pixel P1' after reduction maintains the signal intensity.

FIG. 6D shows a state in which the signal intensity of part of a character is decreased. In contrast, the signal intensity of the character region (see FIG. 6C) is not decreased. This indicates that the character region has been enhanced, resulting in an increase in character readability by the process according to this embodiment.

FIGS. 6A to 6C and 6D show an example of resolution conversion from 300 dpi to 150 dpi. However, when original image data is generated at a resolution of 150 dpi from the beginning, substantially similar results to FIG. 6D may be obtained. This is because there is no more than the difference between the numerical mean value and the optical mean value.

In other words, the effects of character enhancement according to the embodiment are offered by generating original image data at a resolution higher than a designated resolution (a resolution after reduction processing) and then executing enhancement processing.

(3) Second Image Reducing Method

Figure 7:
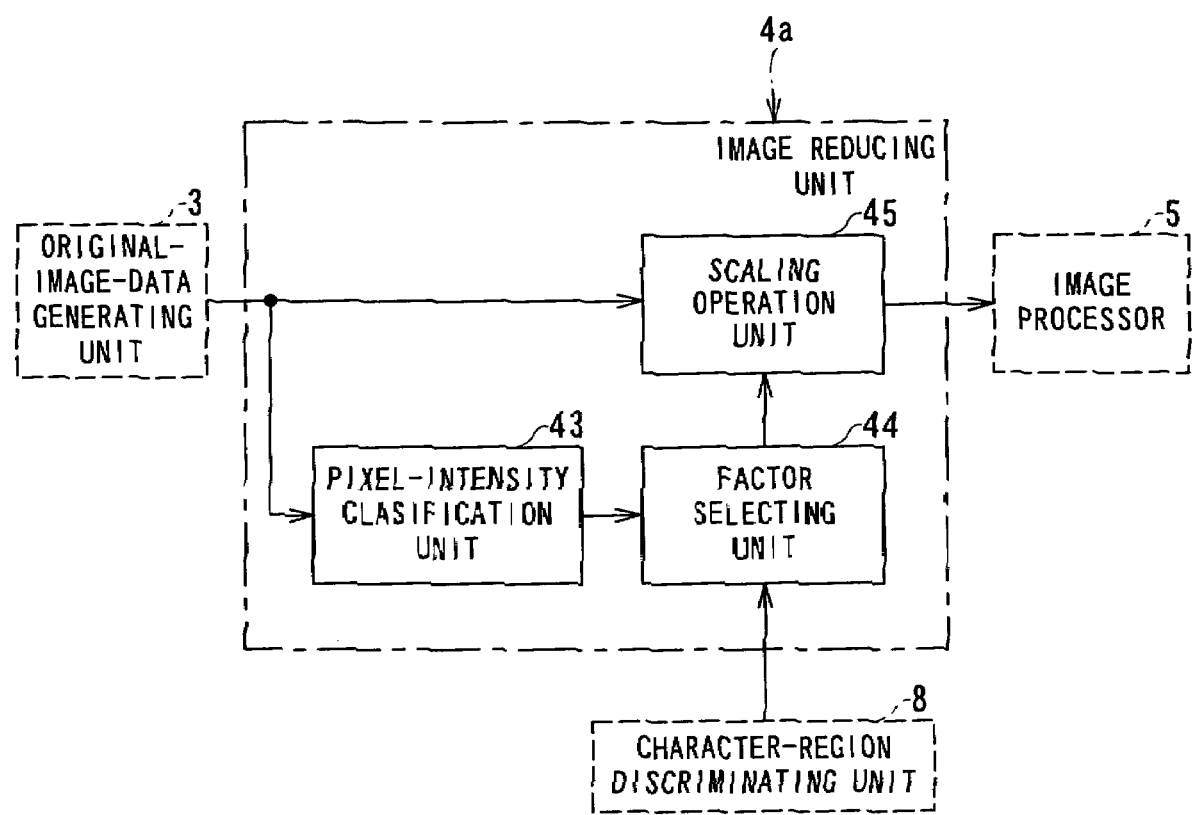
FIG. 7 is a block diagram of a second structural example of the image reducing unit of the image forming apparatus according to the first embodiment.

FIG. 7 is a block diagram of an image reducing unit 4a of the image forming apparatus 1 according to a first embodiment with a second image reducing method.

The image reducing unit 4a includes a pixel-intensity classification unit 43; a factor selecting unit 44; and a scaling operation unit 45.

The pixel-intensity classification unit 43 determines the signal intensity of original image data by pixel with thresholds, and classifies them into multiple density groups (or intensity groups), e.g., three groups of "density group 1", "density group 2", and "density group 3".

The factor selecting unit 44 includes a table of specified weighting factors defined by a density group and the discrimination on a character and a noncharacter (the character region is "1" and the noncharacter region is "0").

The scaling operation unit 45 averages a specified number of target pixels by weighting to generate reduced pixels. For example, to reduce a resolution from 300 dpi to 150 dpi, two pixels are averaged by weighting to generate one pixel. For example, to reduce a resolution from 600 dpi to 200 dpi, three pixels are averaged by weighting to generate one pixel.

When a weighting factor is selected as appropriate, target pixels can be averaged by weighing, depending on the density group or the discrimination on a character and a noncharacter. Even for the same density group, by setting the weight for the character region higher than that for the noncharacter region, the signal intensities of the pixels in the character region can be enhanced and averaged, so that a reduced image with enhanced characters can be generated.

FIG. 8A to FIG. 8F are diagrams explaining the method of reduction by the image reducing unit 4a according to the second image reducing method by way of example.

FIG. 8A shows the intensities of the pixel signals of original image data; FIG. 8B shows the results of discrimination between a character and a noncharacter; and FIG. 8C shows density groups in which the intensities of image signals are classified.

FIG. 8D shows an example of a weighting factor table of the factor selecting unit 44. On the weighting factor table shown in FIG. 8D, the weighting factors for "density group 2" and "density group 3" are set higher ("1.0" or "1.2") for the character region (discrimination "1") than that for the noncharacter region (discrimination "0"). As a result, a reduced image in which a character region is enhanced as compared with a noncharacter region can be generated in the "density group 2" and "density group 3".

The "density group 1" is a region where the density or the signal intensity is low, which has little possibility of a character, so that a low weighting factor ("0.3") is set for both of the character region and the noncharacter region.

(4) Second Embodiment

Figure 9:
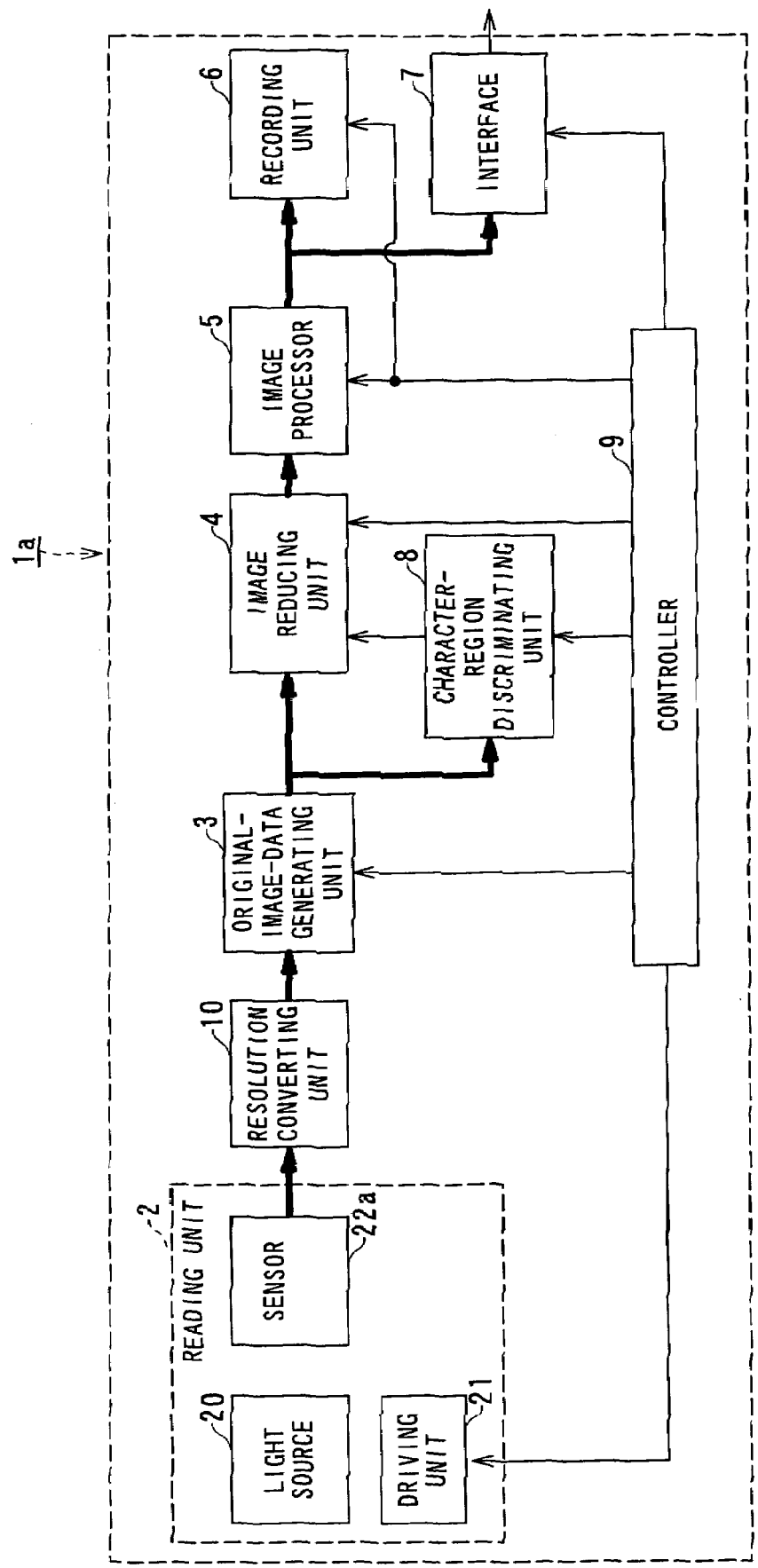
FIG. 9 is a block diagram of an image forming apparatus according to a second embodiment of the invention.

FIG. 9 is a block diagram of an image forming apparatus 1a according to a second embodiment. The image forming apparatus 1a according to the second embodiment has a structure in which a resolution converting unit 10 is added to the image forming apparatus 1 of the first embodiment.

The image forming apparatus 1a according to the second embodiment includes a sensor 22a. The sensor 22a includes three primary-color CCD sensors 220a, 221a, and 222a that output the densities of the three primary colors RGB; and a lightness CCD sensor 223 that outputs the lightness of light and has a resolution higher than that of the primary-color CCD sensors 220a, 221a, and 222a.

Figure 10:
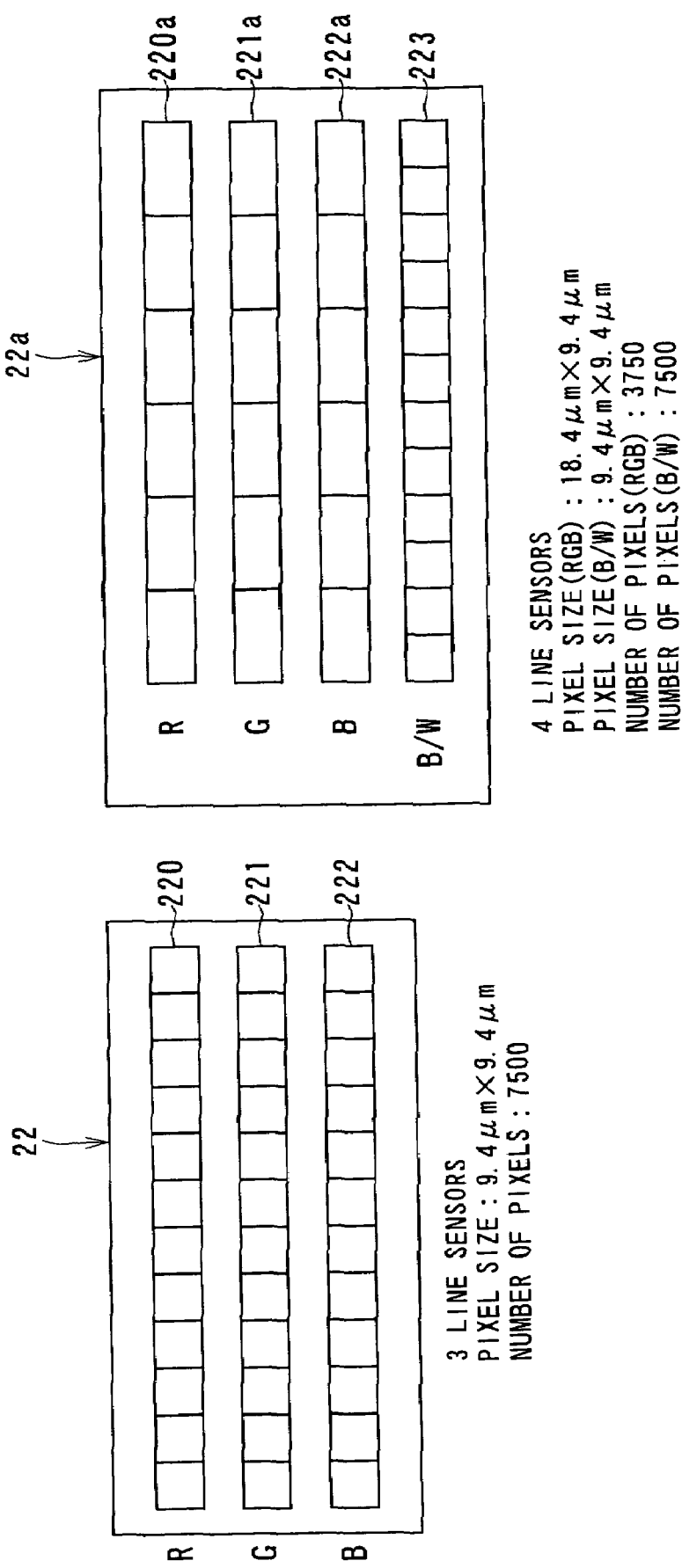
FIG. 10A is a diagram showing the conceptual structure of a sensor of the image forming apparatus according to the first embodiment.
FIG. 10B is a diagram of the conceptual structure of a sensor of the image forming apparatus according to the second embodiment.

FIG. 10A is a diagram showing the conceptual structure of the primary-color CCD sensors 220, 221, and 222 used in the image forming apparatus 1 according to the first embodiment. The primary-color CCD sensors 220, 221, and 222 correspond to a high resolution in the main scanning direction, e.g., 600 dpi, and have a pixel size of, e.g., 9.4 μm×9.4 μm.

In contrast, FIG. 10B is a diagram showing the conceptual structure of the sensor 22a of the image forming apparatus 1a according to the second embodiment. The three primary-color CCD sensors (RGB) 220a, 221a, and 222a are for a low resolution of 300 dpi (half) of the resolution of the lightness CCD sensor (B/W) 223, e.g., 600 dpi.

As shown in FIGS. 10A and 10B, the pixel size of the primary-color CCD sensors 220a, 221a, and 222a according to the second embodiment can provide an area approximately double the area by the primary-color CCD sensors 220, 221, and 222 according to the first embodiment. Accordingly, the amount of light received per unit time doubles that of the first embodiment. As a result, the second embodiment allows reading of a document twice as fast as the first embodiment even when the amounts of light from the light sources are equal.

On the other hand, signals output from the primary-color CCD sensors 220a, 221a, and 222a have a resolution lower than (half of) that of the lightness CCD sensor (B/W) 223.

However, the resolution converting unit 10 can convert the resolution of the output signals from the primary-color CCD sensors 220a, 221a, and 222an to high resolution (twice) using the output signal from the lightness CCD sensor (B/W) 223.

Figure 11:
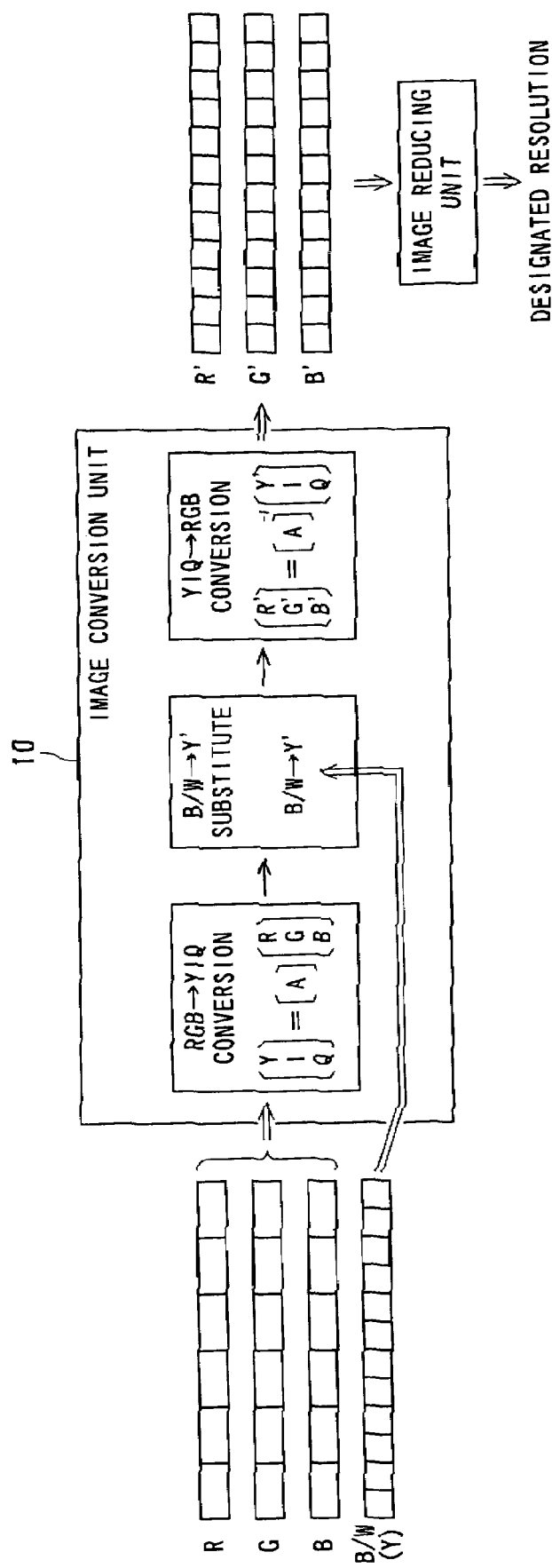
FIG. 11 is an explanatory diagram of the concept of the mechanism of the resolution conversion of the image forming apparatus according to the second embodiment.

FIG. 11 is a diagram explaining the concept of the mechanism of the resolution conversion. The mechanism of the resolution conversion is well known, so that only a rough outline will be given.

The output signals (RGB color space) from the primary-color CCD sensors 220a, 221a, and 222a are converted to a YIQ color space using a specified matrix A, where Y is a signal indicative of the lightness of color, and corresponds to the output signal from the lightness CCD sensor (B/W) 223.

The value Y calculated by matrix operation is substituted for the output signal Y' from the lightness CCD sensor (B/W) 223.

Inverse transformation is executed using the value Y' and the values I and Q calculated by matrix operation to obtain R', G', and B'. The value Y' used for inverse transformation is the output from the lightness CCD sensor (B/W) 223, and has high resolution (e.g., 600 dpi). Accordingly the values R', G', and B' calculated by inverse transformation are also converted to the equal resolution to Y'.

RGB with low resolution (e.g., 300 dpi) are converted to R', G', and B' with high resolution (e.g., 600 dpi) by the foregoing operation.

The converted high-resolution R', G', and B' are input to the original-image-data generating unit 3 to form original image data. The original image data is then input to the image reducing unit 4, where characters are enhanced as in the first embodiment, to generate a reduced image.

FIG. 12 is a diagram showing changes in the resolution of the image forming apparatus 1a according to the second embodiment.

While the resolution of the sensor output in the subscanning direction varies with the driving speed of the light source, the resolution of the outputs of the primary-color CCD sensors 220a, 221a, and 222a is half of that of the lightness CCD sensor (B/W) 223.

Even when the designated resolution is as low as 200 dpi or 150 dpi, the resolution of the lightness CCD sensor (B/W) 223 maintains as high as 400 dpi or 300 dpi. However, in the second embodiment, the resolution of the primary-color CCD sensors 220a, 221a, and 222a is half of that of the lightness CCD sensor (B/W) 223.

The resolution of the sensor output in the main scanning direction is constant irrespective of the designated resolution; the resolution of the lightness CCD sensor (B/W) 223 is 600 dpi, and that of the primary-color CCD sensors 220a, 221a, and 222a is half of that of the lightness CCD sensor (B/W) 223, 300 dpi.

The resolution converting unit 10 converts the resolution of the primary-color CCD sensors 220a, 221a, and 222a by the foregoing matrix operation to be equal to that of the lightness CCD sensor (B/W) 223, and so original image data with such resolution is generated.

Finally, the image reducing unit 4 converts both of the resolutions in the main scanning direction and the subscanning direction to mach the designated resolution. This operation is executed as in the first embodiment.

The second embodiment can achieve a large light-reception area in addition to the effects of the first embodiment, allowing originals to be read at higher speed than the first embodiment.

It is to be understood that the invention is not limited to the foregoing embodiments and that various modifications may be made in the embodiment by transforming or combining the components in the embodiment, or omitting some of the components from all the components of the embodiment without departing from the sprit and scope thereof. Furthermore, the components of different embodiments may be combined as appropriate.

This application claims priority from Japanese Patent Application 2005-074364, filed Mar. 16, 2005, which is incorporated herein by reference in its entirety.

What is claimed is:

1. An image forming apparatus that reads an original by mechanically moving an axial light source in a subscanning direction perpendicular to the axis, the image forming apparatus comprising:
   a sensor configured such that a resolution in a main scanning direction parallel to the axis of the axial light source is higher than a designated resolution;
   a controller that controls a driving speed of the axial light source so that a resolution in the subscanning direction is higher than the designated resolution;
   an original-image-data generating unit that generates original image data with a resolution higher than the designated resolution in response to the output signal from the sensor; and
   an image reducing unit that generates reduced pixels fewer than a specified number of pixels in the main scanning direction and the subscanning direction in the original image data to generate a reduced image with a resolution in the main scanning direction and the subscanning direction equal to the designated resolution.

2. The image forming apparatus according to claim 1, further comprising
   a character-region discriminating unit that discriminates between a character region and a noncharacter region of the original image data,
   wherein the image reducing unit generates the reduced pixels from the specified number of pixels by setting a weight for a pixel-signal intensity of the character region higher than that of a pixel-signal intensity of the noncharacter region.

3. The image forming apparatus according to claim 1, further comprising:
   a character-region discriminating unit that discriminates between a character region and a noncharacter region of the original image data; and
   a pixel-intensity classifying unit that classifies a pixel-signal intensity of the original image data into a plurality of groups,
   wherein the image reducing unit weights the pixel-signal intensity of the original image data on the basis of a weight table set in advance depending on a classification of the pixel-signal intensity and a classification between the character region and the noncharacter region to generate the reduced pixels from the weighted specified number of pixels.

4. The image forming apparatus according to claim 1, wherein
   the sensor includes three primary-color CCD sensors that output an intensity of the three primary colors RGB; and a lightness CCD sensor that outputs a lightness of light and has a resolution higher than that of the primary-color CCD sensors;
   the image forming apparatus further comprises a resolution converting unit that converts the resolution of the primary-color CCD sensors to a resolution equal to that of the lightness CCD sensor; and
   the original-image-data generating unit generates original image data with a resolution higher than the designated resolution in response to the output from the primary-color CCD sensors with the converted resolution.

5. An image forming method that reads an original by mechanically moving an axial light source in a subscanning direction perpendicular to the axis, the image forming method comprising the steps of:
   outputting a signal from a sensor, the signal indicating a resolution in a main scanning direction parallel to the axis of the axial light source higher than a designated resolution;
   controlling a driving speed of the axial light source so that a resolution in the subscanning direction is higher than the designated resolution;
   generating original image data with a resolution higher than the designated resolution in response to the output signal from the sensor; and
   generating reduced pixels fewer than a specified number of pixels in the main scanning direction and the subscanning direction in the original image data to generate a reduced image with a resolution in the main scanning direction and the subscanning direction equal to the designated resolution.

6. The image forming method according to claim 5, further comprising the step of:
   discriminating between a character region and a noncharacter region of the original image data,
   wherein the reduced-image generating step generates the reduced pixels from the specified number of pixels by setting a weight for a pixel-signal intensity of the character region higher than that for a pixel-signal intensity of the noncharacter region.

7. The image forming method according to claim 5, further comprising the steps of:
   discriminating between a character region and a noncharacter region of the original image data; and classifying a pixel-signal intensity of the original image data into a plurality of groups, wherein the reduced-image generating step weights the pixel-signal intensity of the original image data on the basis of a weight table set in advance depending on a classification of the pixel-signal intensity and a classification between the character region and the noncharacter region to generate the reduced pixels from the weighted specified number of pixels.

8. The image forming method according to claim 5, wherein the sensor includes three primary-color CCD sensors that output an intensity of the three primary colors RGB; and a lightness CCD sensor that outputs a lightness of light and has a resolution higher than that of the primary-color CCD sensors;

the image forming method further comprises the step of converting the resolution of the primary-color CCD sensors to a resolution equal to that of the lightness CCD sensor; and the original-image-data generating step generates original image data with a resolution higher than the designated resolution in response to the output from the primary-color CCD sensors with the converted resolution.

* * * * *